Dec. 2, 1941.  E. W. SEEGER ET AL  2,264,863
SYNCHRONOUS MOTOR STARTER
Filed March 27, 1939
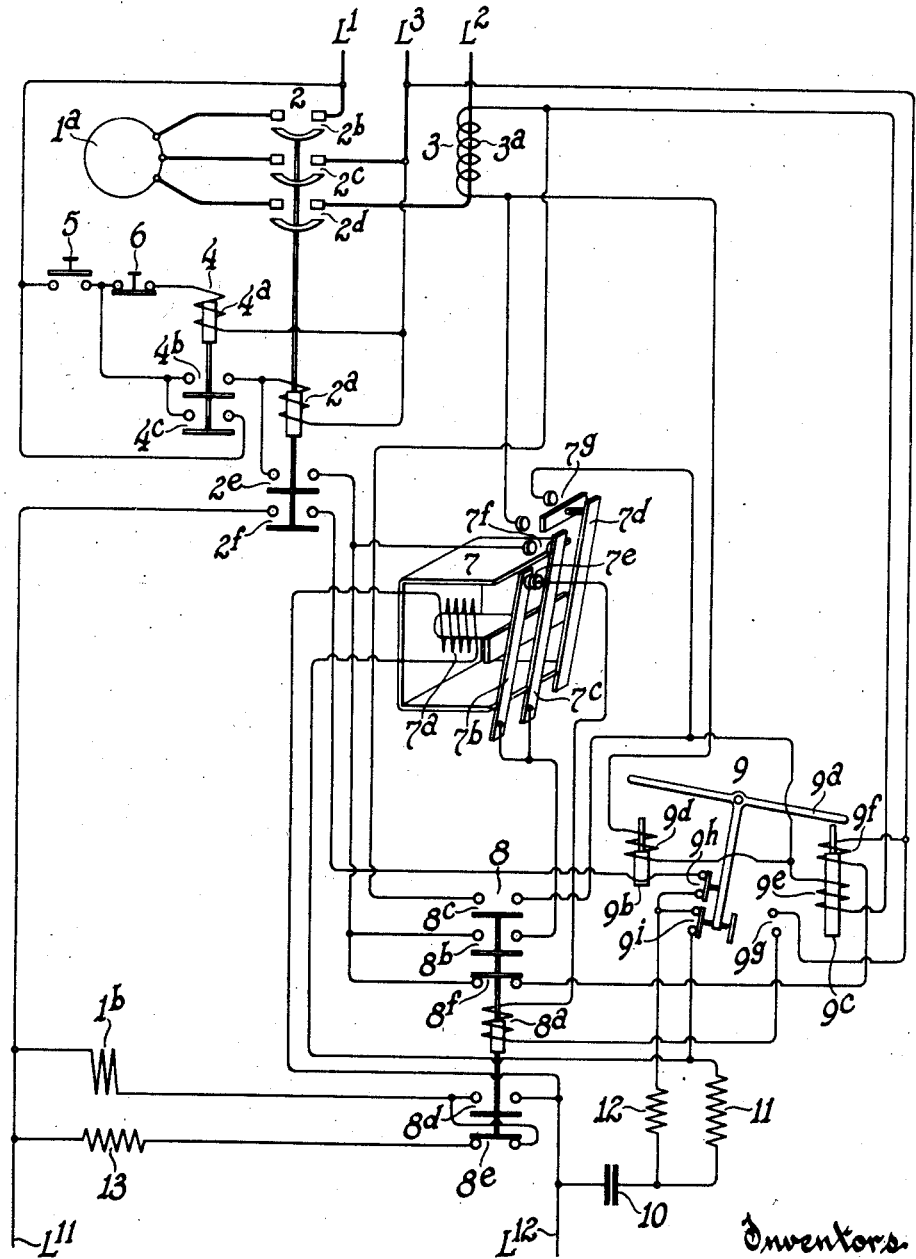
Inventors
Edwin W. Seeger
Carroll Stansbury
Victor S. Sywulka
By
Attorney Patented Dec. 2, 1941

2,264,863

UNITED STATES PATENT OFFICE 2,264,863

SYNCHRONOUS MOTOR STARTER

Edwin W. Seeger, Carroll Stansbury, and Victor S. Sywulka, Wauwatosa, Wis., assignors to Cutler-Hammer, Inc., Milwaukee, Wis., a corporation of Delaware Application March 27, 1939, Serial No. 264,284

8 Claims. (Cl. 172—289)

This invention relates to the control of the direct current excitation of synchronous dynamo-electric machines which are started by the application of alternating current to their armature winding and when near synchronous speed have their field excited by direct current to thereafter pull into synchronism. The present invention is particularly applicable to the control of the field excitation of synchronous motors, as it not only provides for the automatic excitation of the field winding when during the starting period the motor has accelerated to the proper speed, but it also provides for the temporary opening of the field excitation circuit if the motor after having been synchronized should fall out of step from any cause and for the reclosure of the field excitation circuit if the motor subsequently attains again the proper speed for closure of the field circuit.

An object of the invention is to provide automatic means for controlling the field excitation circuit of a synchronous dynamo-electric machine in accordance with the effective load current in the armature circuit of the machine.

Another object is to provide an automatic controller of the aforementioned type which completes the closure of the field excitation circuit after initiation of such closure irrespective of a temporary rise of the armature current during synchronization of the motor.

Another object is to provide a relay for a controller of the aforementioned type which is responsive to the effective armature current to commutate the motor field circuit.

Another object is to provide time delay means for controlling the field excitation of a synchronous motor in such a manner that the excitation control is not affected by transient currents incident to synchronization of the motor armature.

Other objects and advantages will hereinafter appear.

The accompanying drawing illustrates diagrammatically a motor control system which incorporates the invention.

The drawing shows the following: A three phase supply line $L^1$, $L^2$, $L^3$, supplies an armature winding $I^a$ of a synchronous motor with energy. The motor is provided with a direct current field winding $I^b$ which may be supplied with energy from a direct current supply line $L^{11}$, $L^{12}$. The motor armature current is controlled by an electromagnetic main switch 2, having an energizing winding $2^a$, normally open main contacts $2^b$, $2^c$, $2^d$ and normally open auxiliary contacts $2^e$ and $2^f$. A current transformer 3 having a secondary winding $3^a$ has its primary winding connected in series with the line $L^2$. A control relay 4 is provided with an energizing winding $4^a$ and normally open contacts $4^b$ and $4^c$. A normally open push button switch 5 and a normally closed push button switch 6 provide for manual starting and stopping of the equipment. A timing relay 7 is provided with an energizing winding $7^a$, and three armatures $7^b$, $7^c$ and $7^d$. The armature $7^b$ actuates a normally closed contact $7^e$, the armature $7^c$ a normally open contact $7^f$, and the armature $7^d$ supports the insulated bridging member of normally open contacts $7^g$. An electromagnetic field switch 8 has an energizing winding $8^a$, normally open contacts $8^b$, $8^c$, $8^d$ and normally closed contacts $8^e$ and $8^f$. A double throw relay 9 has a pivoted operating lever $9^a$ which is arranged so that it may be rotated in opposite directions by armatures of magnets $9^b$ and $9^c$ respectively and so that it will remain in the position to which it has been moved when the respective magnet armature drops back by gravity. The magnet $9^b$ may be energized by a magnetizing coil $9^d$ to lift its armature for clockwise rotation of the lever $9^a$ while a coil $9^f$ when energized is adapted to lift the armature of magnet $9^c$ for counterclockwise rotation of the lever $9^a$ while a coil $9^e$ when energized exerts a downward pull on the armature of magnet $9^c$ to prevent it from being lifted by the coil $9^f$. The lever $9^a$ is provided with an insulated conducting member adapted to bridge stationary contacts $9^g$ when the lever is in its extreme counterclockwise position and with similar insulating conducting members adapted to bridge stationary contacts $9^h$ and $9^i$ respectively when the lever is in its extreme clockwise position. A condenser 10 is connected in series with a high resistor 11 to form a circuit in shunt with the winding $7^a$, while a second low resistor 12 is connected between the common points of condenser 10 and resistor 11 and contacts $9^h$, $9^i$, respectively. A resistor 13 is connected in series with contacts $8^e$ across the field winding $I^b$.

In the following will be explained the connections and the operation of the system: Let it be assumed that the lines $L^1$, $L^2$, $L^3$ and the lines $L^{11}$, $L^{12}$ are energized. To start the equipment the push button 5 is depressed, thereby establishing a circuit from line $L^1$ over push button switches 5 and 6, coil $4^a$, to line $L^3$. Thereupon relay 4 closes contacts $4^c$ which shunt push button 5 so that the relay 4 remains energized when push button 5 is released. Should it be desired at any time to stop the equipment push button 6 is momentarily depressed, which opens the circuit of relay coil 4ᵃ and returns the relay to the "off" position not to reclose until push button 5 is again depressed. When relay 4 is energized a second circuit is established from line L¹ over contacts 4ᶜ, 4ᵇ, coil 2ᵃ to line L³. This energizes the main switch 2 and closes contacts 2ᵇ, 2ᶜ and 2ᵈ thereby connecting the motor armature to the alternating current lines which starts the motor as an induction motor, the field winding 1ᵇ being short circuited through the resistor 13 and contacts 8ᵉ. A brief interval after closing of its main contacts the switch 2 closes its auxiliary contacts 2ᵉ and 2ᶠ.

As soon as the main contacts of switch 2 close and prior to the closure of contacts 2ᵉ and 2ᶠ current flows in the transformer winding 3ᵃ which energizes the coils 9ᵈ and 9ᵉ, the coil 9ᵉ holding the armature 9ᶜ in its lowermost position, while the armature 9ᵇ is lifted to rotate the lever 9ᵃ to the position shown in the drawing, if it should not initially be in this position. A moment thereafter coil 9ᶠ is also energized by closure of contacts 2ᵉ, but the armature 9ᶜ is prevented from lifting by the combined downward pull of coil 9ᵉ and gravity. A circuit is also established from line L¹¹ through contacts 2ᶠ, 9ʰ, 9ⁱ, coil 7ᵃ to line L¹² which energizes relay 7 and opens contacts 7ᵉ and closes contacts 7ᶠ and 7ᵍ, and a circuit parallel to coil 7ᵃ is established through resistors 11 and 12 and condenser 10 to line L¹². This charges condenser 10 rapidly to its full charge through the low resistor 12, only a small additional charge passing through the high resistor 11. Closure of contacts 7ᵍ short circuits the winding 9ᵈ. If now the armature current of the motor decreases as the motor accelerates, the pull of the winding 9ᵉ, which is now connected through the contacts 7ᵍ across the secondary winding 3ᵃ decreases to a point where the pull of winding 9ᶠ exceeds the pull of the winding 9ᵉ and the armature 9ᶜ moves the lever 9ᵃ counterclockwise to open contacts 9ʰ and 9ⁱ and to close contacts 9ᵍ. Closure of contacts 9ᵍ prepares a circuit for energization of coil 8ᵃ. Opening of contacts 9ʰ and 9ⁱ opens the connection of coil 7ᵃ to line L¹¹ but the magnetic flux in relay 7 is momentarily maintained and only decreases gradually as the condenser 10 discharges through coil 7ᵃ, the decay of the flux being determined by the value of resistor 11. As the flux gradually decreases the armature 7ᵇ drops and closes contacts 7ᵉ, thereby completing an energizing circuit for the coil 8ᵃ from line L¹ over contacts 4ᶜ, 4ᵇ, 2ᵉ, 7ᶠ, 7ᵉ, coil 8ᵃ, contacts 9ᵍ to line L³. The relay 8 thereupon closes the contacts 8ᵈ to connect the field winding 1ᵇ across the lines L¹¹, L¹² and opens the shunt circuit through resistor 13 by opening of contacts 8ᵉ. The relay also closes contacts 8ᵇ which maintain coil 8ᵃ energized when contacts 7ᶠ open by shunting the latter. Relay 8 also opens the contacts 8ᶠ thereby de-energizing coil 9ᶠ and it closes contacts 8ᶜ which short circuits coil 9ᵉ.

After further decay of the flux of relay 7, the armature 7ᶜ drops, thereby opening contacts 7ᶠ. After a further interval during which the motor normally synchronizes, the armature 7ᵈ drops and opens contacts 7ᵍ which reinserts winding 9ᵈ into circuit with the transformer coil 3ᵃ. If the current in the motor armature 1ᵃ should then exceed a given amount, as by failure to synchronize or by pulling out of step, the armature 9ᵇ again rotates the lever 9ᵃ clockwise, thereby deenergizing the field relay 8, disconnecting the field circuit and reenergizing relay 7, whereupon the action of the system is repeated as aforedescribed.

It will be noted that for an interval after the closure of the field relay 8 determined by the time delay in the release of armature 7ᵈ the winding 9ᵈ is short circuited to prevent the relay lever 9ᵃ from being actuated during said interval and thus disconnect the field switch. The purpose of this arrangement is to prevent transient peaks of current during the synchronization of the motor armature from causing the opening of the field switch. Furthermore a time delay is introduced between the moment when the motor current on starting drops to the desired value for closure of the field circuit and the response of the field switch. This delay is provided by the delay in the dropping of armature 7ᵇ and has the purpose to prevent the excitation of the motor on momentary transient dips in the starting current.

What we claim as new and desire to secure by Letters Patent is:

1. In a controller for a synchronous dynamo-electric machine having an armature and a field winding, the combination of electromagnetic means for controlling the energization of said field winding in response to variations in the effective value of the armature current, and means responsive to the operation of said former means to modify the response of said former means for a given time interval after establishment of energization of said field winding.

2. In a controller for a synchronous dynamo-electric machine having an armature and a field winding, the combination of electromagnetic means responsive to the effective value of the armature current to effect energization of said field winding when said current is below a given value and to prevent energization thereof when said current exceeds said value, and means responsive to the operation of said former means to modify the response of said former means for a given time interval after establishment of energization of said winding.

3. In a controller for a synchronous dynamo-electric machine having an armature and a field winding, the combination of an electromagnetic field switch for controlling said field winding, electromagnetic means for controlling said field switch in response to variations in the effective value of the armature current and means controlled by the operation of said field switch for modifying the current response of said electromagnetic means for a given time interval after initial operation of said field switch.

4. In a controller for a synchronous dynamo-electric machine having an armature and a field winding, the combination of an electromagnetic field switch for controlling said field winding, an electromagnetic timing relay, a double throw relay effective in one position to energize said timing relay and in another position to energize said field switch, and provided with a first electromagnet adapted to be energized by the armature current of the motor for moving said relay to said one position and with a second electromagnet including electromagnetic biasing means for moving said relay to said other position and an energizing coil for said second electromagnet responsive to said armature current to oppose said biasing means, said timing relay being provided with means to render said biasing means ineffective when said field switch is energized and to modify response of said first electromagnet for a given time interval after initial energization of said field switch.

5. A relay for controlling the field excitation of a synchronous motor having an armature, a field winding and an excitation circuit for the latter, comprising the combination with a switch for controlling said circuit, a first electromagnet adapted to be energized by the armature current of the motor for opening said switch, a second electromagnet including electromagnetic biasing means to effect closure of said switch and an energizing winding responsive to said armature current and opposing said biasing means, means effective during closure of said switch to render said biasing means ineffective to oppose said first electromagnet, and associated means to render said first electromagnet ineffective for a given time interval after initial closure of said switch.

6. A relay for controlling the field excitation of a synchronous motor having an armature, a field winding and an excitation circuit for the latter, comprising in combination with a plurality of alternately closed contacts, a first electromagnet adapted to be energized by the armature current of the motor to close certain of said contacts, a second electromagnet including electromagnetic biasing means to effect closure of the other of said contacts and an energizing winding responsive to said armature current and opposing said biasing means, means effective during the closure of said other contacts to render said biasing means ineffective to oppose said first electromagnet, and means rendered effective by the closure of certain of said contacts to render said first electromagnet ineffective and to maintain it ineffective for a given time interval after the opening of said last mentioned contacts.

7. A controller for a synchronous dynamo-electric machine having an armature and a field winding comprising, a main switch for energizing said armature and having an auxiliary contact, an electromagnetic field switch for energizing said field winding, a double throw relay having a pair of alternately closed switches, a first electromagnet adapted to be energized by the armature current of the motor to close one of said last mentioned switches, a second electromagnet including a coil to effect closure of the other of said last mentioned switches and a winding opposing the pull of said coil and responsive to said armature current, a timing relay having a control winding energized by closure of said one of said last mentioned switches and having a set of contacts operative with a time delay to energize said field switch upon movement of said double throw relay to open said one of said last mentioned switches and to close said other of said last mentioned switches and further having a set of contacts for shunting said first electromagnet for a given time after the opening of said other of said last mentioned switches.

8. In a controller for a synchronous motor having an armature and a field winding, a main switch for connecting the armature to an alternating current source, a field switch for connecting said field winding to a direct current source, a timing relay and a double throw relay for controlling said field switch, said double throw relay having a pair of contacts adapted to afford energization of said timing relay in one of its positions and a second pair of contacts adapted to afford energization of said field switch in another position, a first coil responsive to the armature current of the motor for moving the double throw relay to said one position and an electromagnet having a coil arranged to be energized when said main switch is closed and said field switch is open for moving said double throw relay to said other position and another coil arranged to be energized by the armature current to oppose the action of the second mentioned coil, said timing relay having a pair of contacts cooperating with said second pair of contacts affording energization of said field switch upon deenergization of said timing relay with a time delay and having another pair of contacts adapted to shunt said first coil of said double throw relay while the latter is in said one position and to maintain said shunt for a time interval after said double throw relay moves from said one to said other position.

EDWIN W. SEEGER.
CARROLL STANSBURY.
VICTOR S. SYWULKA.